UNITED STATES PATENT OFFICE.

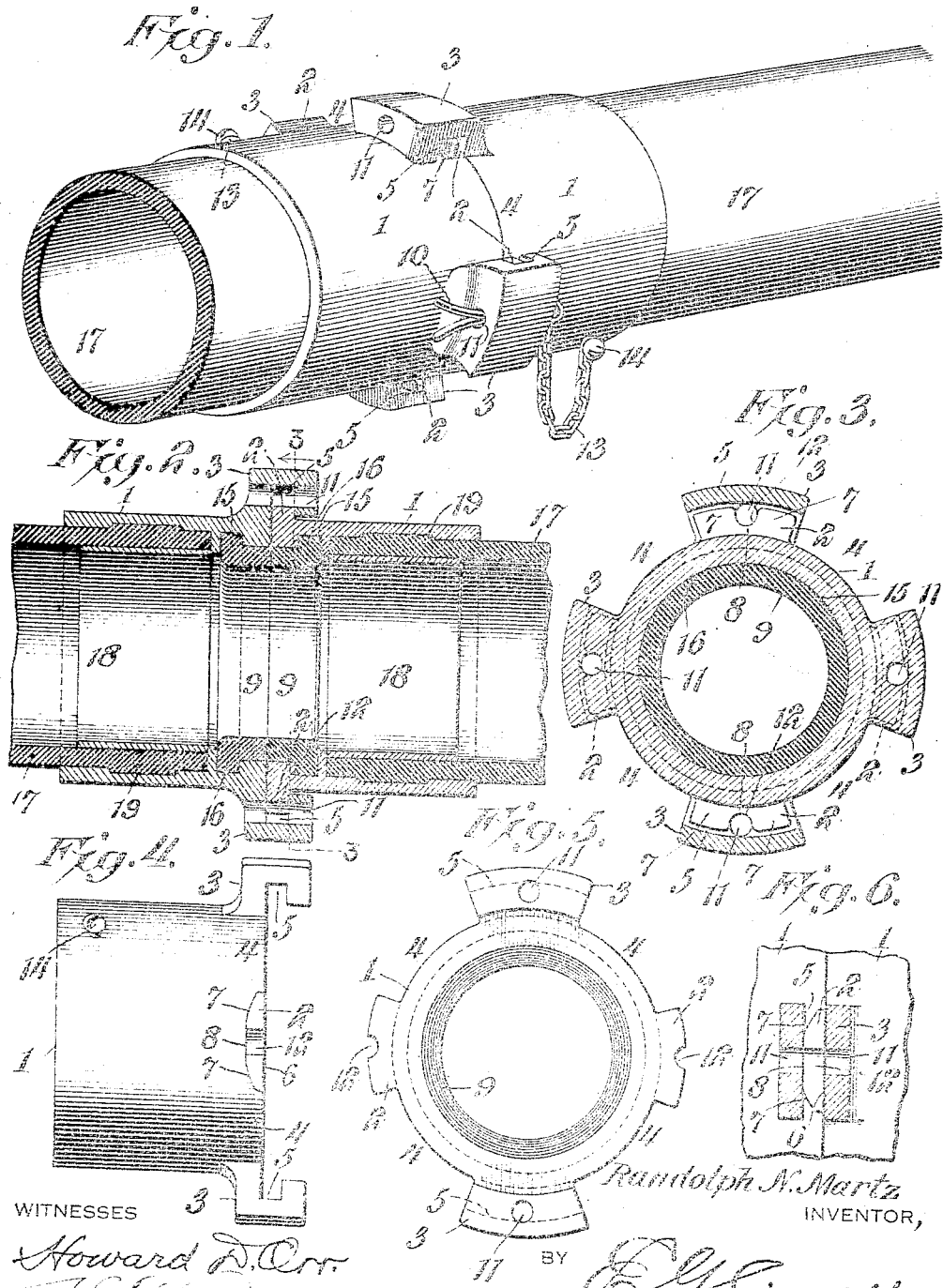

RANDOLPH N. MARTZ, OF FREDERICK, MARYLAND.

HOSE-COUPLING.

1,128,474. Specification of Letters Patent. Patented Feb. 16, 1915.

Application filed December 31, 1913. Serial No. 809,796.

*To all whom it may concern:*

Be it known that I, RANDOLPH N. MARTZ, a citizen of the United States, residing at Frederick, in the county of Frederick and State of Maryland, have invented a new and useful Hose-Coupling, of which the following is a specification.

The invention relates to improvements in hose couplings.

The object of the present invention is to improve the construction of hose couplings, and to provide a simple, inexpensive and efficient coupling designed for use on hose of various sizes, such as garden hose, fire hose, and also as a plug connection and adapted to dispense with screw threads and eliminate springs and at the same time enable hose sections to be easily and rapidly connected and securely locked together.

A further object of the invention is to provide a hose coupling of this character adapted to obviate the necessity of employing male and female portions and composed of two identically similar sections in which there will be neither top or bottom nor right or left and with which there will be no danger of laying a hose down backward and causing delay in the coupling of the sections thereof.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a perspective view of a hose coupling, constructed in accordance with this invention, and shown applied to a portion of a hose. Fig. 2 is a longitudinal sectional view of the same. Fig. 3 is a transverse sectional view on the line 3—3 of Fig. 2. Fig. 4 is a plan view of one of the tubular coacting sections. Fig. 5 is an end elevation of the same. Fig. 6 is a detail sectional view, illustrating the construction of the lugs and the coacting blocks or keepers.

Like numerals of reference designate corresponding parts in all the figures of the drawing.

In the accompanying drawing in which is illustrated the preferred embodiment of the invention, the hose coupling comprises in its construction two similar tubular coacting sections 1, designed to be constructed in various sizes to adapt the coupling for all kinds of hose and other conduits where it is necessary to couple and uncouple them at intervals, and the said tubular sections, which may be constructed of any suitable material, are each provided with one or more lugs 2 and blocks or keepers 3 spaced apart to provide intervening spaces or passageways 4 to enable the blocks or keepers and the lugs of the two coacting tubular sections to pass one another in connecting up the sections. When the sections are designed to be used in connection with small hose, such as garden hose, each section will be provided with a single lug and a single block preferably located at diametrically opposite points. When the two sections are interlocked, this will provide a connection at diametrically opposite points. For fire hose and other large hose, each section is preferably provided with a pair of lugs and a pair of blocks or keepers, as illustrated in the accompanying drawing, but the number of lugs and blocks or keepers may be varied to suit the diameter of the hose or other pipes to be connected.

The lugs and blocks or keepers, which are formed integral with the sections, are arranged at and project from the peripheries of the same, and the block or keeper 3, which is preferably oblong in front elevation, projects longitudinally of the section beyond the meeting face or end thereof and is provided with a recess 5, extending entirely through the block and having its inner side wall arranged in flush relation with the adjacent end face of the tubular section. When the two tubular sections are fitted together with their meeting faces substantially contacting, the projecting portions of the blocks or keepers of each section extend over the other section and are adapted when the sections are partially rotated to receive the coacting lugs in their recesses 5, whereby the sections are held against longitudinal displacement.

The lug 2, which extends transversely of the exterior of the section 1, has a flat front or outer face 6 arranged in flush relation with the adjacent meeting end face of the said section 1. The lug 2 is oppositely beveled at its inner or rear face to provide a pair of cam edges or faces 7 at each side of the central portion 8 of the rear face. The central portion 8 of the rear face is preferably flat, as shown, and the end portions of the lug taper outwardly from the central portion thereof. The rear cam faces of the lugs of each section engage with the outer side walls of the recesses of the blocks or keepers of the other section, and when the sections are partially rotated to carry the lugs into the recesses 5 of the coacting blocks or keepers, the cam edges draw the sections together and are adapted to compress elastic gaskets 9 of rubber or other suitable material, whereby a perfectly water tight joint is made and maintained. In assembling the sections, the lugs and blocks or keepers of one section are arranged opposite the spaces between the lugs and blocks or keepers of the other section with the gaskets of the two sections fitting against each other. The sections are then partially rotated to carry the lugs into the blocks or keepers. When the lugs are engaged with the blocks or keepers, they may be disengaged therefrom by rotating the sections either to the right or left. Also the sections may be placed together with the lugs at either end of the keepers so that either a right or left hand rotary movement of the sections will engage them with each other.

The lugs are locked in the blocks or keepers by fastening devices consisting preferably of cotter pins 10 extending through alined perforations 11 in the opposite walls of the recesses of the blocks or keepers and engaging central notches 12 formed in the peripheral edges of the lugs and extending laterally thereof. Each section is preferably equipped with a cotter pin connected with its respective section by a chain 13 secured at one end to the cotter pin and at its other end to the said section by a screw 14 or other suitable fastening means. By locking the lug at the center thereof and arranging the notch 12 at the outer or peripheral edge of the lug, the lugs are double acting in that they may be disengaged from the keepers by a movement in either direction and may be arranged to engage with the keepers at either end thereof, and the locking action does not affect or lessen the compression of the gaskets so that a tight joint is maintained at all times. The double cam or wedge-shaped lugs with the coacting keepers are adapted to enable a water tight joint to be made with a packing of paper or other material interposed between the meeting end edges or faces of the tubular sections. This is an advantage in case of the loss of a gasket or the supply thereof should run short. Also the compression of the gaskets does not crush or injure the same and the latter will remain effective as long as there is life in the rubber.

The tubular sections are provided with interior annular grooves 15 adapted to receive peripheral flanges 16 of the gaskets 9, which are annular. The hose 17 is secured within the tubular sections by metallic thimbles 18, which are expanded within the tubular sections to compress the terminal portions of the hose and cause the same to expand within interior recesses 19 of the tubular sections of the coupling.

The gaskets are under the greatest compression when the sections are in their central or locked position. The front wall of the recess of the block or keeper is straight and arranged in parallelism with the meeting ends of the tubular sections, and is engaged by the rear cam face of the coacting lug. The outer or front face of the lug is straight and engages the straight inner wall of the said recess. These engaging portions, together with the meeting ends of the tubular sections, make three separate points of engagement, which effectually eliminate any rocking of the sections on each other or any checking of the rapid assembling of the said sections.

What is claimed is:—

A pipe coupling of the class described comprising two similar coacting tubular sections having meeting end faces, each section being provided on its exterior with a projecting lug provided at its outer peripheral edge with a central laterally extending notch, a projecting keeper carried by each of the sections and provided with a recess disposed transversely of the section and having a straight front wall in parallelism with the said end meeting faces, said lug being oppositely beveled at its rear face and engaging the front wall of the recess of the keeper and adapted to draw the said end faces into contact with each other, the front face of the lug being straight and fitting against the rear wall of the said recess, said sections, when coupled, having three separate bearing portions and the said keeper being also provided in its front and rear walls with centrally alined openings adapted to register with the peripheral notch of the lug, and a fastening device removably arranged in and extending through the said openings and engaging the peripheral notch of the lug.

In testimony that I claim the foregoing as my own, I have hereto affixed my signature in the presence of two witnesses.

RANDOLPH N. MARTZ.

Witnesses:
THOMAS A. CHAPLINE,
J. MARSHALL MILLER.